United States Patent

Studenick et al.

[15] 3,698,667
[45] Oct. 17, 1972

[54] SYSTEM FOR STABILIZING TORQUE BETWEEN A BALLOON AND GONDOLA

[72] Inventors: David K. Studenick, Beltsville; Allen L. Tyler, Baltimore; Walter Squillari, Greenbelt, all of Md.

[73] Assignee: The United States of America as represented by the Administrator of the National Aeronautics and Space Administration

[22] Filed: March 24, 1971

[21] Appl. No.: 127,618

[52] U.S. Cl. ................................................. 244/32
[51] Int. Cl. ................................................. B64b 1/40
[58] Field of Search ............ 244/31, 32, 33; 318/648; 73/133, 136 R, 136 A

[56] References Cited

UNITED STATES PATENTS 3,490,059   1/1970   Paulsen et al. ................. 73/133
3,072,367   1/1963   Evanick et al. ................. 244/32
3,069,114   12/1962  Maas ............................ 244/31
2,666,177   1/1954   Brannin et al. ............... 73/136 A Primary Examiner—Milton Buchler
Assistant Examiner—Gregory W. O'Connor
Attorney—R. F. Kempf, Neil B. Siegel and John R. Manning

[57] ABSTRACT

A balloon is connected to a stabilized gondola by a parachute having shroud lines. The top of the parachute is connected to the balloon via an active bearing having a motor driven in response to the output of a torque sensor connected between the shroud lines and gondola. In response to the sensed torque exceeding a predetermined level, pulses are periodically applied to the active bearing to limit the torque buildup between the balloon and gondola to a low value.

8 Claims, 5 Drawing Figures

INVENTORS,
DAVID K. STUDENICK
ALLEN L. TYLER
WALTER SQUILLARI

BY

ATTORNEYS

INVENTORS,
DAVID K. STUDENICK
ALLEN L. TYLER
WALTER SQUILLARI
BY
ATTORNEYS

SYSTEM FOR STABILIZING TORQUE BETWEEN A BALLOON AND GONDOLA

ORIGIN OF THE INVENTION

The invention described herein was made by employees of the United States Government and may be manufactured and used by or for the Government for governmental purposes without the payment of any royalties thereon or therefor.

FIELD OF INVENTION

The present invention relates generally to systems for minimizing the torque in the suspension of a gondola carried by a balloon and, more particularly, to a system wherein a torque sensor connected between shroud lines of a parachute and the gondola supplies control signals to an active bearing connected between the parachute and balloon.

BACKGROUND OF THE INVENTION

Gondolas carried by high altitude balloons frequently have requirements for very precise pointing accuracy, particularly if a tracking element, such as a telescope, is secured thereto. In one particular requirement, a tracking telescope is included in a gondola having a gross weight of approximately 2,500 pounds and must be stabilized to an angle to within five arc seconds. The problem of stabilization is complicated because once the balloon reaches inner space altitude, on the order of 100,000 feet, it tends to rotate in a random fashion at a relatively slow velocity, on the order of three to four revolutions per hour. The random rotation of the balloon is eventually transferred to the gondola via parachute shroud lines.

The apparently obvious solution to the problem of stabilization, particularly with regard to random rotation of the balloon, is to use a thrust bearing and to design a gondola attitude control system sufficiently large to overcome the bearing breakaway torque. Gondola systems having pointing accuracies in the arc second region, however, cannot tolerate the slip-stick action of a statically loaded thrust bearing. To obviate the problems of a statically loaded thrust bearing, the prior art has frequently resorted to elaborate designs, such as multiple thrust bearings, mercury bearings, air bearings, triple race motorized bearings and high inertial mass systems.

While these prior art techniques are satisfactory for many applications, many do not perform adequately for a system having pointing accuracy requirements on the order of five arc seconds. Others are inoperative at an altitude on the order of or greater than 100,000 feet, and some cannot support a load of approximately 2,500 pounds. For example, in a system employing static thrust bearings in combination with high inertial masses to stabilize the gondola, the breakaway friction of the thrust bearing causes torsional oscillations of five to seven degrees with a 20 second oscillatory period. Mercury bearings are not satisfactory at altitudes on the order of 100,000 feet because the temperature at that altitude is frequently on the order of −40° F, while mercury freezes at −38° F. The disadvantage of utilizing a triple race bearing for supporting a 2,500 pound gondola is that the bearing produces a continuous torque between the gondola and balloon. In response to the continuous torque, the gondola must be continuously biased, thereby requiring a substantial amount of power to maintain stabilization. While an air bearing would perform satisfactorily to meet the requirements, the weight of an air bearing system is considered excessive. In addition, the air bearing system is relatively complex and expensive. A problem with the use of the air bearing is that the system is susceptible to failure if a speck of dust gets into the bearing.

A further system developed to permit stabilizing a gondola connected by a parachute shroud to a balloon includes a sensor and torque controller connected between the lower ends of shroud lines and the gondola. Analysis made pursuant to the development of the present invention indicates that such an approach can lead to unstable rotation of the gondola and/or the requirement for the continuous application of power by the torque controller to the gondola. The analysis indicates that the shroud line acts essentially as a soft torsion spring which requires almost continuous adjustment and is susceptible to oscillation.

As a result of the analysis, it has been found that the balloon can be considered as a fixed or reference body having a moment of inertia in the vertical direction on the order of 1,000 times that of the gondola. Because of the relatively large moment of inertia of the balloon, it is desirable for the bearing to react directly against the balloon. To this end, in accordance with the present invention an active bearing, including a motor, is connected between the upper end of the parachute and the lower end of the balloon to negate a torque buildup through the parachute and shroud lines to the gondola. The motor of the active bearing is driven in response to signals derived from a torque sensor connected between the lower end of the shroud lines and the gondola. In response to the sensed torque exceeding a predetermined level, the bearing is driven in steps by the motor until the torque is below the predetermined level. Current is supplied to the motor driving the active bearing with a relatively low duty cycle to minimize power requirements. A low duty cycle can be tolerated because of the close coupling between the active bearing and the fixed reference body, the balloon. By having the active bearing located at the source of the torque, beneath the balloon, the entire suspension system including the parachute and shroud lines, acts as an energy storage device with a relatively long time constant. Because of the long time constant of the suspension system, a relatively slow actuation rate for the active bearing can be tolerated, whereby the continuous application of energy to the active bearing is obviated.

It is, accordingly, an object of the present invention to provide a new and improved system for controlling the torque buildup in the suspension of a gondola connected to a balloon via parachute shroud lines.

Another object of the present invention is to provide a new and improved system to permit controlling the pointing angle of a gondola weighing approximately 2,500 pounds to an angle on the order of five arc seconds, wherein the gondola is carried by a balloon to altitudes on the order of 100,000 feet.

A further object of the present invention is to provide a new and improved system to permit controlling the pointing angle of a gondola carried by a balloon and shroud lines of a parachute, which system is not susceptible to instability and does not require the continuous application of power to bias the gondola.

Still another object of the invention is to provide a new and improved system to permit controlling the pointing angle of a gondola carried by a balloon and shroud lines of a parachute, which system is less expensive, more reliable and has lower power requirements than prior art systems.

Still another object of the present invention is to provide a system to permit controlling the pointing angle of a gondola carried by a balloon and shroud lines of a parachute wherein a relatively long time constant is provided in the coupling structure between the gondola and the balloon, which functions as a reference body.

The above and still further objects, features and advantages of the present invention will become apparent upon consideration of the following detailed description of one specific embodiment thereof, especially when taken in conjunction with the accompanying drawings.

DETAILED DESCRIPTION OF THE FIGURES

Figure 1:
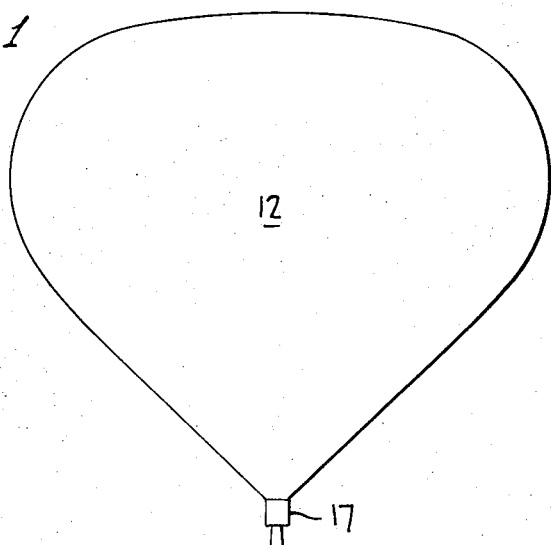
FIG. 1 is a schematic diagram of the entire system of the present invention.

Reference is now made to FIG. 1 of the drawings wherein there is illustrated a gondola 11 which is connected to balloon 12 via parachute 13 and parachute shroud lines 14. In a typical configuration, balloon 12 has a maximum diameter on the order of 200 feet and a height of approximately 170 feet with a moment of inertia in the vertical direction of approximately 410,000 slug·ft$^2$ Gondola 11 weighs on the order of 2,500 pounds and has a moment of inertia along its vertical axis of approximately 500 slug·ft$^2$. The total height of the system, from the bottom of gondola 11 to the top of balloon 12, is on the order of 400 feet, while the total length of parachute 13 and shroud lines 14 is approximately 225 feet. Rigidly connected to the upper surface of gondola 11 and pointing in a direction approximately 60° to the horizontal is telescope 15. Telescope 15 is rotatable with gondola 11 so that the angular position of the gondola must be accurately stabilized in order to control the pointing direction and field of view of the telescope.

A torque control system to permit stabilizing the azimuth of gondola 11 and telescope 15 comprises torque sensor 16 and active bearing 17. Torque sensor 16 is connected between the lower ends of shroud lines 14 and gondola 11 to derive a signal indicative of the difference between the angular position in the vertical plane between the gondola and the bottom ends of the shroud lines. The signal derived from torque sensor 16 is coupled via electric lines, now shown, to active bearing 17, positioned between the lower end of balloon 12 and the upper end of parachute 13. Active bearing 17 includes a motor driving a thrust bearing for imparting relative rotation to shafts connected to balloon 12 and parachute 13. The motor of active bearing 17 is responsive to the output signal of torque sensor 16, whereby the active bearing is driven periodically in steps as long as the torque sensor output exceeds a predetermined level. The motor of the active bearing is driven either clockwise or counter-clockwise depending upon the direction of the torque detected by sensor 16. Pulses can be applied by the motor to the thrust bearing at a relatively low rate, on the order of once every five seconds, at a duty cycle on the order of one percent to minimize the power requirements for the motor. The relatively infrequent application of pulses to the thrust bearing is as a result of the close coupling between the bearing 17 and balloon 12, which functions as a fixed, reference body for the remainder of the system because of its high moment of inertia in the vertical direction.

Figure 2:
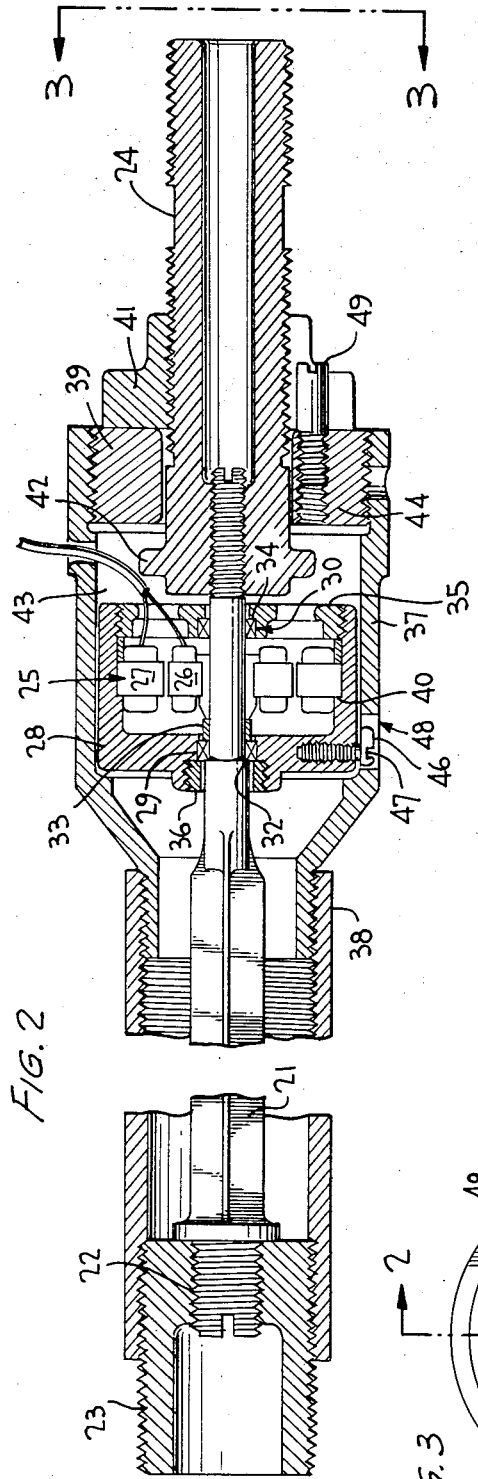
FIG. 2 is a cross-sectional view of a preferred embodiment of the torque sensor of the present invention.
Figure 3:
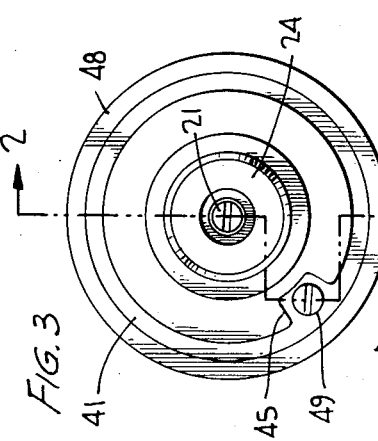
FIG. 3 is an end view of the torque sensor illustrated in FIG. 2.

Reference is now made to FIGS. 2 and 3 of the drawings wherein there is illustrated a preferred embodiment of the torque sensor 16, FIG. 1. Basically, the torque sensor comprises an elongated shaft 21 having opposite ends fixedly connected to the lower ends of shroud lines 14 and gondola 11 and capable of rotation between its ends. Shaft 21 has a length on the order of 20 inches, and a cruciform cross section throughout the vast majority of its length. The cruciform portion of shaft 21 has four mutually orthogonal arms, each having a length of approximately ¼ inch and a thickness on the order of 20 mils. The cruciform configuration provides the necessary tensile load carrying capacity as well as the necessary sensitivity for sensing the torque between the lower end of the shaft to which a gondola 11 is connected and the upper end to which shroud lines 14 are connected. It has been found through analysis that the cruciform cross section enables the length of shaft 21 to be shorter than a rod having the same axial strength and torque sensitivity. One end of shaft 21 is fixedly connected by threads 22 to a bore in fitting cap 23, having fixed connections to the lower ends of shroud lines 14. The other end of shaft 21 is threaded into a bore end fitting 24, which is fixedly connected to gondola 11.

To monitor the angle between the upper end of shaft 21, connected through fitting cap 23 to the lower ends of shroud line 14, and the lower end of the shaft, connected through end fitting 24 to gondola 11, i.e., the torque between the lower ends of shroud lines 14 and gondola 11, synchro transformer 25 is provided. Synchro transformer 25 includes a rotor winding 26 bonded to a cylindrical portion of shaft 21 proximate end fitting 24. Stator winding 27 of transformer 25 is concentric with rotor winding 26 and is fixedly mounted on piston 28, that is in turn fixedly connected to the upper end of shaft 21 through cylindrical housing 37 and elongated tube 38. The cylindrical portion of shaft 21 extends through a bore provided in the central portion of piston 28 and is free to rotate relative to the piston by virtue of ball bearing assemblies 29 and 30. Axial movement of ball bearing assembly 29 relative to shaft 21 is prevented by shoulder 32 on shaft 21 and shaft spacer 33 while ball bearing assembly 30 is maintained in proper axial registration by shoulder 34 on piston end cap 35. Piston end cap 35 is screwed on the end of piston 28 and is held in situ by the annular spacer 33 that abuts against the housing of transformer 25, which in turn seats against shoulder 40 within piston 28.

To provide proper axial alignment between shaft 21 and piston 28, bearing 29 is seated on shoulder 32, spacer 33 is installed, rotor 26 is abutted against spacer 33 and cemented in place. Nut 36 is screwed down to retain the outer race of bearing 29 thus capturing it in the piston 28. The assembly including bearings 29 and 30 in combination with spacer 33 and nut 36 minimizes the torque between shaft 21 and piston 28 and functions properly in low temperature environments, that exist at altitudes on the order of 100,000 feet, as well as at higher temperatures usually encountered at sea level.

End fitting 24 is provided with a boss 42 that is axially translatable within an annular cavity 43 extending radially between end fitting 24 and the interior surface of housing 37 and which extends axially between the end faces of piston cap 35 and nut 39. Nut 39 is threadedly connected to housing 37 and radially spaced from end fitting 24 so that it is axially translatable with the upper end of shaft 21, i.e., nut 39 is axially translatable relative to end fitting 24 and boss 42. Axial movement of end fitting 24 towards gondola 11 is limited by boss 42 while upward movement of the end fitting 24 is limited by tension nut 41 that is threaded on end fitting 24. By limiting the axial translation of end fitting 24 the shaft 21 is prevented from being over stressed. The relative axial position between the rotor 26 and stator 27 is limited to prevent a large null background signal from being derived from transformer 25. In response to an axial load resulting in a translation of boss 42 into contact with nut 39 a shear load is developed on the boss so that it has a tendency to seat on nut 39. In normal operation, excessive axial movement tending to seat boss 42 occurs only during the descent portion of a flight when the retardation forces of parachute 13 produce very high vertical acceleration loading on the torque sensor 16. Since a mission is normally completed when high acceleration is experienced during descent, the requirement for the torque sensor to function properly no longer exists and seating can be tolerated. During other normal operating conditions, a clearance exists between the faces of boss 42 and nut 39 so that the friction of shaft 21 is only that of bearings 29 and 30.

To prevent excessive twisting of sensing shaft 21, torque limiting screw 49 is threaded into axially extending bore 44 in nut 39. The end portion of screw 49 extends through radial slot 45 of nut 41 which is locked to end fitting 24, The radially extending edges of slot 45 are selectively engaged by the exterior surface of screw 49 in response to a predetermined rotational displacement of nut 41 relative to nut 39. In one embodiment, the relative rotation between nuts 39 and 41 was allowed to be plus or minus five degrees. By limiting the rotation between the nuts 39 and 41 to plus or minus five degrees, the maximum torsional force that can be applied to shaft 21 is limited to a value that is sufficiently low to prevent over stressing of shaft 21.

To control manually a fine null between the two windings, axially directed screw 46 is provided. Screw 46 has an eccentric head with a seat 47. Screw 46 extends through a slotted aperture 48 in cylinder 37 into a radially directed, threaded bore within piston 28. The eccentric screw 46 enables a slight angular rotation of piston 28 and stator 27 relative to rotor 26 to effect fine null manual rotational adjustment between the stator and rotor. Because of slotted aperture 48 a limited amount of axial movement of piston 28 relative to housing 37 can occur. The axial motion permitted by slot 48 is on the order of one-tenth of an inch, sufficient to allow axial movement of the piston due to elongation of the shaft when supporting the gondola. With proper initial manual adjustment of screw 46 a zero output signal is derived from transformer 25 only in response to zero torque being applied to shaft 21 by the ends of shroud lines 14 and gondola 11.

Figure 4:
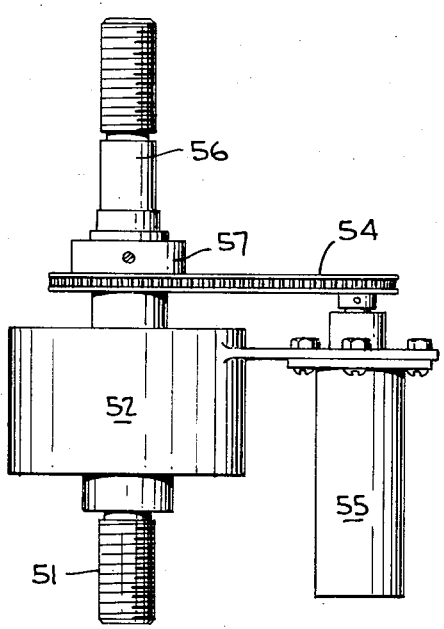
FIG. 4 is a side view of a preferred embodiment of the active bearing in the system of FIG. 1.

Reference is now made to FIG. 4 of the drawings wherein there is illustrated a preferred embodiment for active bearing 17. Bearing 17 includes a shaft 51, extending from the lower end of thrust bearing housing 52 and connected to the upper end of parachute 13. Extending from the upper end of thrust bearing housing 52 is bearing shaft 56 which is driven through a sprocket 57 and chain drive 54 by the output shaft of reversible, d.c. motor 55, whereby parachute 13 is rotatably driven relative to balloon 12 about a vertical axis extending through coaxial shafts 51 and 56. A sprocket 57 and chain drive 54 between motor 55 and bearing shaft 56 is utilized because it is not susceptible to jamming and does not require tight tolerance controls; in addition it provides sufficient strength to transmit the torque loads between motor 55 and bearing shaft 56. Motor 55 is fixedly secured to thrust bearing housing 52 and thereby rotates about shaft 56. Shaft 56 is fixedly connected to the bottom of balloon 12.

Figure 5:
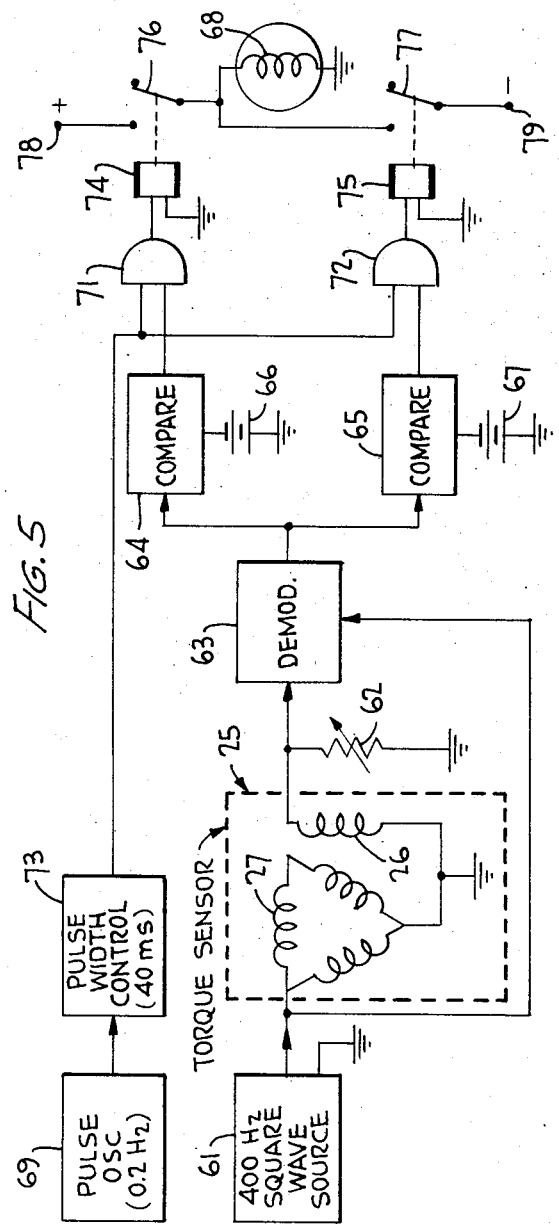
FIG. 5 is a circuit diagram of a preferred embodiment of the control system for the active bearing.

Reference is now made to FIG. 5 of the drawings wherein there is illustrated a circuit diagram of a preferred embodiment for controlling motor 55 in response to the output of torque sensor 16. The amplitude of the torque detected by sensor 16 is determined by synchro transformer 25 having a stator 27 driven by 400 Hertz square wave source 61. The angular rotation between windings 26 and 27 is reflected in the phase of the 400 Hertz output signal across coil 26. To set the sensitivity of the device the output voltage across coil 26 is controlled by adjusting resistor 62, connected in shunt across the output coil. The voltage developed across resistor 62 is fed to one input of phase demodulator 63, having a second input responsive to the output of square wave source 61. The output of demodulator 63 is a bipolarity d.c. voltage indicative of the phase displacement between the inputs to the demodulator and hence is commensurate with the relative angle and direction between winding 27 and rotor 26.

The output voltage of demodulator 63 is applied in parallel to comparators 64 and 65. Comparators 64 and 65 are also respectively responsive to negative and positive d.c. voltages of the same amplitude, as derived from sources 66 and 67. In response to the negative output voltage of demodulator 63 exceeding the voltage of negative d.c. source 66, comparator 64 derives a positive output voltage; whenever the voltage of source 66 exceeds or equals the input of comparator 64, the comparator output is a zero level. Similarly, comparator 65 derives a positive output voltage only in response to the positive output voltage of demodulator 63 exceeding the voltage of positive d.c. source 67. Thereby, in response to the output voltage of demodulator 63 being less than the absolute value of the voltages of sources 66 and 67 a zero level voltage is derived by comparators 64 and 65 and the comparator network can be considered as effectively including a deadband.

The outputs of comparators 64 and 65 periodically, rather than continuously, control winding 68 of d.c. motor 55. To this end, a relatively low frequency pulse oscillator 69, having a frequency on the order of 0.2 Hertz, feeds coincidence gates 71 and 72 through pulse width control network 73. Pulse width control network 73 shapes the pulses derived from oscillator 69 so that they have a width on the order of 40 milliseconds, whereby pulses fed to coincidence gates 71 and 72 have a duty cycle on the order to one percent. Coincidence gates 71 and 72 can feed the outputs of comparators 64 and 65 only while the 40 millisecond pulses are being derived from control network 73 to enhance the stability and minimize power requirements of the system of the present invention.

Bidirectional control of motor 55 in response to the outputs of comparators 64 and 65, as well as the periodic output of controller 73, is attained by connecting relay coils 74 and 75 to the outputs of coincidence gates 71 and 72, respectively Relay coils 74 and 75 control normally open circuited contacts 76 and 77, respectively. Contacts 76 and 77 selectively connect the equal amplitude positive and negative d.c. voltages at terminals 78 and 79 to winding 68 of motor 55.

In operation, in response to a predetermined torque in either direction being detected by sensor 16, demodulator 63 derives a d.c. output voltage (of either polarity) that exceeds the voltages of sources 66 and 67. The outputs of comparators 64 and 65 are sampled in response to the output of pulse width control network 73 by coincidence gates 71 and 72. Each time a pulse is supplied to a coincidence gate responsive to a positive output of one of the comparators, the relay coil connected to the coincidence gate is energized to close the associated contact 76 or 77. The contact is closed momentarily to periodically drive the output shaft of motor 55 in predetermined steps each time a pulse is derived from control network 73, which occurs as long as a positive voltage is derived from a comparator. Because of the step drive for motor 55 and the deadband between the output of demodulator 63 and the reference voltages applied to comparators 64 and 65 by sources 66 and 67, a high level of stability, commensurate with the long time delay between the action of bearing 17 and the response of gondola 11, is achieved with a minimum of power.

While there has been described and illustrated one specific embodiment of the invention, it will be clear that variations in the details of the embodiment specifically illustrated and described may be made without departing from the true spirit and scope of the invention as defined in the appended claims.

We claim:

1. A system for stabilizing the torque between a balloon and a gondola connected to each other by shroud lines extending from a parachute comprising a torque sensor connected between the lower ends of the lines and the gondola for deriving a signal indicative of the torque between the gondola and lines, and an active bearing connected between the upper end of the parachute and the balloon driven in response to the signal for rotating the parachute relative to the balloon.

2. The system of claim 1 further including means responsive to the torque between the gondola and lines for deriving a drive signal for the active bearing only in response to the sensed torque exceeding a predetermined magnitude.

3. The system of claim 1 further including means responsive to the torque between the gondola and lines for supplying a torque to the active bearing only in response to the sensed torque exceeding a predetermined magnitude.

4. The system of claim 1 further including means responsive to the torque between the gondola and lines for periodically supplying a torque to the active bearing only as long as the sensed torque exceeds a predetermined magnitude.

5. The system of claim 1 wherein the torque sensor includes an elongated shaft having one end fixedly connected to the lines and the other end fixedly connected to the gondola, said shaft having a cruciform cross section through the major portion of its length.

6. The system of claim 5 wherein the torque sensor includes means for limiting the axial movement of the shaft.

7. The system of claim 5 wherein the torque sensor includes means for limiting the torsional force applied between the ends of the shaft.

8. The system of claim 5 wherein the torque sensor includes a housing fixedly mounted to the other end of the shaft, a rotational position sensor having one element fixedly mounted on the one end of the shaft and a second element fixedly mounted on the housing, said elements being concentric with each other and the shaft, and the axial and rotational positions of said elements.

* * * * *